UNITED STATES PATENT OFFICE 2,215,380

BONDED ABRASIVE

Robert C. Swain, Riverside, and Donald W. Light, Old Greenwich, Conn., assignors to American Cyanamid Company, New York, N. Y., a corporation of Maine No Drawing. Application March 10, 1939, Serial No. 261,060

6 Claims. (Cl. 51—298)

This invention relates to abrasive articles and compositions of the type in which a finely divided abrasive material is cemented together or to a backing by a resinous bonding material. An object of the invention is to provide abrasive articles of this class having higher heat-resistance and better mechanical strength. A further object is the provision of a novel class of binders for molded abrasive articles which will wet the abrasive particles and therefore give a strong bond without the use of extreme molding pressures. Still further objects will become apparent from the following description, when taken with the claims appended thereto.

We have found that an improved class of bonded abrasive articles is obtained when binders containing aminotriazine-aldehyde resins are used. We have found that this class of resins may be used as the sole bonding material, or that they may advantageously be mixed or blended with other resinous materials such as phenol-formaldehyde type resins. Bonded abrasives containing aminotriazine-aldehyde resins are extremely heat-resistant; the bond does not weaken at the high temperatures encountered in high-speed grinding but remains strong and durable and gives a long effective life to the abrasive article.

In addition to their heat-resistance, the aminotriazine-aldehyde resins have other characteristics which render them especially well suited for use in the manufacture of bonded abrasives. Although they are completely water-resistant they readily wet the abrasive granules during manufacture of the article, and therefore give a strong bond and eliminate the necessity of using modifying agents which might impair their heat-resistance and other valuable properties. They are therefore well suited, not only for the manufacture of molded pieces but for use as binders for abrasives with paper, cloth and metal backings such as sandpaper, emery paper, buffing cloths, and the like. They may be employed with any type of abrasive or buffing material such as abrasive alumina, silica, garnet, diamond, pumice, abrasive alloys and the like.

The broad principles of our invention are not limited to any single aminotriazine-aldehyde condensation product, and any resinophoric material of this class may be used if desired. However, the condensation products of melamine and its derivatives such as 2.4.6 triethyl and triphenyl triamino 1.3.5 triazines, 2.4.6 trihydrazino 1.3.5 triazine and the corresponding condensed triazines such as melam and melem appear at the present time to be of greatest immediate commercial importance, by reason of the availability of melamine and its derivatives from dicyandiamide or cyanuric chloride as raw materials, and for this reason abrasive compositions containing these clases of materials constitute preferred embodiments of the invention. On the other hand, triazines containing one or two reactive amino groups such as ammeline, ammelide, formoguanamine, 2 amino 1.3.5 triazine and their substitution products as well as nuclear substituted aminotriazines such as 2 chloro 4.6 diamino 1.3.5 triazine, 2 phenyl 4 amino 6 hydroxy 1.3.5 triazine, 6 methyl 2.4 diamino 1.3.5 triazine and the like can be condensed with lower or higher aliphatic, aromatic or heterocyclic aldehydes to produce heat-resistant binders for abrasives and such condensation products are therefore included in the invention in its broader aspects.

Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce resins suitable for use in the manufacture of bonded abrasives in accordance with the principles of the invention.

The condensation between the aminotriazine and the aldehyde may take place under acid, neutral or alkaline conditions, and in the presence or absence of a solvent for the incompletely polymerized reaction products which are first formed. These condensation products may be prepared by any suitable process and in any desired combining ratio of aldehyde to aminotriazine from 1:1 up to and including 6:1. Representative methods of preparation will be described in the examples which are to follow.

While abrasive articles of excellent characteristics can be prepared by using the aminotriazine-aldehyde resins as the only bonding or adhesive constituent, it is frequently of advantage to employ these binders in admixture with other resinous or adhesive materials. This is particularly true in the case of molded abrasive articles such as grinding wheels and the like. Thus, for example, we have found as an additional important feature of the invention that mixtures of triazine-aldehyde condensation products such as melamine-formaldehyde resins with phenol-formaldehyde resins can be prepared which have almost as good heat-resistance as the melamine-formaldehyde resins themselves, and which are considerably cheaper and easier to manufacture. These mixed resins are prepared by reacting a mixture of the aminotriazine and phenol with formaldehyde, followed by dehydration and curing of the resinous bonding agent-abrasive mixture in the presence of a suitable curing agent. It is another remarkable feature of the invention that by employing an acid curing agent such mixed aminotriazine-phenol-formaldehyde resins can be cured in a much shorter time than can the corresponding phenol-formaldehyde resins prepared from similar classes of material.

The invention will be illustrated in greater detail by the following specific examples. It should be understood, however, that although these examples describe certain of the more specific features of the invention they are given primarily for illustrative purposes, and that the invention in its broader aspects is not limited thereto.

Example 1

126 parts by weight of melamine were suspended in 162 parts by weight of 37% formaldehyde to which sufficient sodium hydroxide had been added to raise the pH to 7.2–9.0. The mixture was heated to reflux temperatures and refluxed for 10 minutes. The resulting syrup was cooled and introduced into a commercial spray drier of the following construction:

The drier consisted of a cylindrical chamber 16 feet in diameter and 18 feet high provided with a non-shearing feed disk 12 inches in diameter rotated at 10,000 R. P. M. Hot air was introduced at a temperature of 470° F. and taken off at 205° F. A 2 inch vacuum was maintained in the chamber and 10½ inches pressure across the hot air fan.

The syrup was fed to the spray drier at the rate of 10 pounds per minute, and the spray-dried product was removed continuously in the form of a dry white powder.

Molded abrasive wheels were made from a 60 mesh crystalline alumina known by the trade name "Alundum." 100 parts of the spray-dried methylol melamine were mixed with 1.5 parts of phthalic acid and 200, 400 and 800 parts of the "Alundum," respectively. The mixtures were molded into disks under 5000 lb. per square inch pressure at 100–150° C. for 7–10 minutes, depending on the thickness of the piece. The pieces prepared using the 1:2 ratio had too high a resin content, as excess resin was squeezed out during the molding step but the other ratios were satisfactory. All the disks were completely water-resistant and could be heated to high temperatures without softening, cracking or carbonization. They showed excellent abrasive properties.

Example 2

100 parts of the spray-dried methylol melamine prepared as described in Example 1 were mixed with 200 parts of anhydrous butanol which had been acidified by the addition of 1 part of 85% phosphoric acid. The mixture was heated with agitation at 60–80° C. until a clear solution was obtained.

The resin solution so obtained is well suited for use as a binder in the manufacture of sandpaper, emery paper and the like, but improved results are obtained when a plasticizer is added. 50 parts of the resin solution were therefore mixed with 50 parts of a plasticizing resin prepared by heating 147 parts of phthalic anhydride with 90 parts of glycerine and 190 parts of castor oil at 225° C. until a suitable viscosity was reached. The resinous mixture was spread upon heavy kraft paper, a coating of sharp silica sand was applied and pressed into the resin, and the paper was baked at 150° C. for 3 minutes. There resulted an excellent grade of sandpaper having a long and effective life.

Example 3

240 parts by weight of 37.5% formaldehyde solution are neutralized by the addition of about 7 parts of half normal sodium hydroxide solution until a pH of 9.0–9.1 is obtained. 126 parts of melamine and 115 parts of 82% phenol are then added and the mixture is warmed to 60° C. and held at this temperature until the melamine dissolves. Activated carbon and diatomaceous earth are stirred in and the solution is filtered. The clarified solution is refluxed at 96° C. for one hour and is then dehydrated by evaporation of water under a 21 inch vacuum. Upon cooling a hard, brittle resin is obtained which is ground to 150–300 mesh.

100 parts of the ground resin were mixed with 1.75 parts of phthalic acid, oxalic acid, or similar acid curing agent, suitable amounts of zinc stearate or other lubricant and 400 parts of abrasive alumina of 100 mesh size. The mixture was molded under the conditions outlined in Example 1, and excellent abrasive disks were obtained.

In the foregoing example the phenol may be substituted, in whole or in part, by meta-cresol, para-cresol, or mixtures thereof when a cheaper binder and a softer flow in the mold are desired. Xylenols such as 1.2.4-xylenol and 1.3.5-xylenol may also be included in amounts up to about 50% of the total phenol or cresol used, if desired.

What we claim is:

1. An abrasive article comprising particles of abrasive and an aminotriazine-aldehyde resin cured in contact therewith.

2. An abrasive article comprising particles of abrasive and an aminotriazine-aldehyde resin cured in contact therewith by heating in the presence of an acid curing agent.

3. An abrasive article comprising particles of abrasive and a melamine-aldehyde resin cured in contact therewith.

4. An abrasive article comprising particles of abrasive and a melamine-formaldehyde resin cured in contact therewith.

5. An abrasive article comprising particles of abrasive and an alkylated melamine-aldehyde resin cured in contact therewith.

6. An abrasive article comprising particles of abrasive and a butylated melamine-aldehyde resin cured in contact therewith.

ROBERT C. SWAIN.
DONALD W. LIGHT.

DISCLAIMER 2,215,380.—*Robert C. Swain*, Riverside, and *Donald W. Light*, Old Greenwich, Conn. BONDED ABRASIVE. Patent dated September 17, 1940. Disclaimer filed March 27, 1943, by the assignee, *American Cyanamid Company*.

Hereby enters this disclaimer to claims 1, 2, 3, and 4, in said specification.

[*Official Gazette April 20, 1943.*]